US012761365B2

(12) United States Patent
Hu et al.

(10) Patent No.: US 12,761,365 B2
(45) Date of Patent: Oct. 13, 2026

(54) RANGING SYSTEM AND MOBILE PLATFORM

(71) Applicant: Yinwang Intelligent Technologies Co., Ltd., Shenzhen (CN)

(72) Inventors: Chihao Hu, Wuhan (CN); Lei Yan, Wuhan (CN); Wei Xiong, Wuhan (CN); Ke Huang, Wuhan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 269 days.

(21) Appl. No.: 17/848,832

(22) Filed: Jun. 24, 2022

(65) Prior Publication Data

US 2022/0334263 A1 Oct. 20, 2022

Related U.S. Application Data

(63) Continuation of application No. PCT/CN2019/129045, filed on Dec. 27, 2019.

(51) Int. Cl.
*G01S 17/931* (2020.01)
*G01S 7/481* (2006.01)
*G01S 7/51* (2006.01)

(52) U.S. Cl.
CPC .......... *G01S 17/931* (2020.01); *G01S 7/4815* (2013.01); *G01S 7/4817* (2013.01); *G01S 7/51* (2013.01)

(58) Field of Classification Search
CPC .... G01S 17/931; G01S 7/4815; G01S 7/4817; G01S 7/51; G01S 7/4812; G01S 17/93; G01S 7/4813; G01S 7/497; G01S 7/481; G02B 26/0816; G01C 3/06; G01C 3/08
See application file for complete search history.

(56) References Cited

U.S. PATENT DOCUMENTS

| | | | | |
|---|---|---|---|---|
| 5,455,669 | A | 10/1995 | Wetteborn | |
| 7,403,269 | B2 | 7/2008 | Yamashita et al. | |
| 8,767,190 | B2 * | 7/2014 | Hall | G01S 17/89 356/9 |
| 8,836,922 | B1 * | 9/2014 | Pennecot | G01S 17/42 356/9 |

(Continued)

FOREIGN PATENT DOCUMENTS

| | | |
|---|---|---|
| CN | 101241182 A | 8/2008 |
| CN | 102338875 A | 2/2012 |

(Continued)

*Primary Examiner* — Adam R Mott
*Assistant Examiner* — Byron Xavier Kasper
(74) *Attorney, Agent, or Firm* — Leydig, Voit & Mayer, Ltd.

(57) ABSTRACT

A ranging system and a mobile platform are provided. The ranging system includes a laser, a coaxial optical lens group, a mirror group, a moving component, and a processing circuit. When the laser emits laser light to the mirror group by using the coaxial optical lens group, the moving component drives the mirror group to rotate, so that the laser light is irradiated to a measured object at different angles, to implement ranging of the measured object. The moving component bears a light object, so that the moving component rotates quickly. Therefore, if the ranging system is installed on a vehicle, the ranging system can implement fast ranging of incoming and outgoing vehicles and meet a ranging requirement of an autonomous driving technology.

16 Claims, 13 Drawing Sheets

(56) References Cited

U.S. PATENT DOCUMENTS

| | | | | |
|---|---|---|---|---|
| 9,910,443 | B1 * | 3/2018 | Lee | B60W 10/06 |
| 2014/0168631 | A1 * | 6/2014 | Haslim | G02B 6/262 356/4.01 |
| 2018/0275251 | A1 * | 9/2018 | Choi | G01S 17/10 |
| 2018/0284225 | A1 * | 10/2018 | Weed | G01S 7/4817 |
| 2019/0025409 | A1 | 1/2019 | Kawazoe et al. | |
| 2019/0277951 | A1 * | 9/2019 | Lin | G01S 7/497 |
| 2019/0383909 | A1 * | 12/2019 | Schnitzer | G01S 7/4817 |
| 2020/0064475 | A1 * | 2/2020 | Hibino | G01S 17/04 |
| 2020/0182977 | A1 * | 6/2020 | Wang | G02B 26/105 |
| 2021/0075186 | A1 | 3/2021 | Zheng et al. | |

FOREIGN PATENT DOCUMENTS

| | | | |
|---|---|---|---|
| CN | 104330843 | A | 2/2015 |
| CN | 105911561 | A | 8/2016 |
| CN | 106093957 | A | 11/2016 |
| CN | 206584043 | U | 10/2017 |
| CN | 207290078 | U | 5/2018 |
| CN | 108445467 | A | 8/2018 |
| CN | 208216603 | U | 12/2018 |
| CN | 109387822 | A | 2/2019 |
| CN | 208672797 | U | 3/2019 |
| CN | 110161514 | A | 8/2019 |
| DE | 4200057 | A1 | 7/1993 |
| EP | 1562055 | A2 | 8/2005 |
| JP | S5183554 | A | 7/1976 |
| JP | 2007139648 | A | 6/2007 |
| JP | 2009063339 | A | 3/2009 |
| JP | 2011027709 | A | 2/2011 |
| JP | 2004170965 | A | 6/2014 |
| JP | 2016534346 | A | 11/2016 |
| WO | 2015026471 | A1 | 2/2015 |
| WO | 2017164989 | A1 | 9/2017 |
| WO | 2019163210 | A1 | 8/2019 |
| WO | 2019205153 | A1 | 10/2019 |

* cited by examiner

RANGING SYSTEM AND MOBILE PLATFORM

CROSS-REFERENCE TO RELATED APPLICATIONS

This application is a continuation of International Application No. PCT/CN2019/129045, filed on Dec. 27, 2019, the disclosure of which is hereby incorporated by reference in its entirety.

TECHNICAL FIELD

Embodiments of this application relate to the field of ranging technologies, and in particular, to a ranging system and a mobile platform.

BACKGROUND

With development of modern technologies, autonomous driving services of vehicles develop rapidly. During autonomous driving, a vehicle needs to measure a distance between the vehicle and each of an obstacle, a road guardrail, and another vehicle to avoid the obstacle, correct lane deviation, and keep a safe distance from the another vehicle. Therefore, a laser ranging system is usually installed on the vehicle to measure a distance between the vehicle and another object, to provide data reference for implementing autonomous driving of the vehicle.

FIG. 1*a* shows an example of a front view of an existing laser ranging system. FIG. 1*b* shows an example of a left view of an existing laser ranging system. FIG. 1*c* shows an example of a three-dimensional diagram of an existing laser ranging system. FIG. 1*d* is a schematic diagram of an existing laser ranging system. The laser ranging system generates laser light by using a laser 104, and emits the laser light to an object through a lens 102. When the object is irradiated by the laser light, the object can reflect the laser light. Then, the laser ranging system may receive the laser light through a lens 101, and analyze the laser light by using a receiver 103, to calculate a distance between the laser ranging system and the object. The laser ranging system may specifically perform ranging by using a pulse method or a phase method. The pulse method is as follows: The laser ranging system records a time point at which the laser light is emitted and a time point at which the laser light is received to obtain a round-trip time difference. Then, the laser ranging system can learn, through calculation, that the distance between the laser ranging system and the object is half of a product of the round-trip time difference and a speed of light.

A main disadvantage of the laser ranging system shown in FIG. 1*a*, FIG. 1*b*, FIG. 1*c*, and FIG. 1*d* is that the lens 101, the lens 102, the receiver 103, and the laser 104 are all disposed on a turntable 105, and the turntable 105 bears a heavy weight. Therefore, the turntable 105 rotates slowly and cannot rotate quickly. If the laser ranging system is installed on a vehicle, the laser ranging system cannot implement fast ranging of incoming and outgoing vehicles and cannot meet a ranging requirement of an autonomous driving technology.

SUMMARY

Embodiments of this application provide a ranging system and a mobile platform. The ranging system can rotate quickly during ranging, to meet a requirement of an autonomous driving vehicle.

A first aspect of embodiments of this application provides a ranging system. The ranging system includes a ranging apparatus and a scanning component. A function of the scanning component is that the scanning component can find an area by using received light, or can return light received in an area to a fixed direction. The ranging apparatus is configured to emit laser light to the scanning component, where the laser light is irradiated to a measured object at different angles through the scanning component. The ranging apparatus is further configured to: receive reflected light from the measured object, and calculate a distance between the ranging system and the measured object based on the laser light and the reflected light.

In a possible implementation, the scanning component includes a moving component and a mirror group (a combination of optical lenses, for example, a plurality of reflector plates and lenses), and the moving component is configured to drive the mirror group to perform scanning. When the moving component rotates, the laser light emitted by the ranging apparatus is irradiated to the measured object through the mirror group. The reflected light from the measured object is returned to the ranging apparatus through the mirror group.

In a possible implementation, the ranging apparatus includes a laser, a receiver, and a plurality of coaxial optical lens groups. A feature of the ranging apparatus is that a key mirror group is shared, and in the shared mirror group, an optical axis (a center line of an optical system) of an emission optical path coincides with an optical axis of a receiving optical path, that is, coaxial design is implemented. The emission optical path and the receiving optical path share a same optical element, so that the coaxial optical lens group can implement the coaxial design. For example, the coaxial optical lens group can implement the coaxial design by using a holed mirror. The holed mirror includes a holed region and an unholed region. The laser is configured to emit the laser light to the mirror group, and the receiver is configured to receive the reflected light by using the unholed region. The ranging apparatus further includes a lens group, and the lens group is installed between the mirror group and the holed mirror, and is configured to: convert the laser light into parallel light, or focus the reflected light. The laser light emitted by the laser passes through the holed region, and reaches the measured object after passing through the lens group and the mirror group. The reflected light reflected by the measured object is reflected by the mirror group, and is reflected by the unholed region to the receiver after passing through the lens group. The ranging apparatus further includes a processing circuit. The processing circuit is connected to the laser and the receiver. The processing circuit is configured to calculate the distance between the ranging system and the measured object based on the laser light and the reflected light.

In the technical solution of this application, a propagation path through which the laser light is emitted by the laser and reaches the measured object is an emission optical path, and a propagation path through which the reflected light is reflected from the measured object and reaches the receiver is a receiving optical path. The propagation path of the emission optical path and the propagation path of the receiving optical path partially coincide and have a same center axis. Therefore, in the technical solution of this application, coaxial design is implemented. An optical lens group configured to implement the coaxial design may be referred to as a coaxial optical lens group. The coaxial design can reduce a quantity of optical elements of the ranging system, and can further reduce an area of the mirror group, thereby facilitating miniaturization of the ranging system.

In the ranging system according to the first aspect of embodiments of this application, only a mirror group configured to adjust a direction of the laser light or a direction of the reflected light is installed on the scanning component, and no heavy ranging apparatus (such as the laser, the receiver, and a related circuit) is installed. Therefore, a turntable can rotate quickly, and the ranging system can quickly scan and measure a distance from an object in a front region during ranging to meet a requirement of an autonomous driving vehicle. In addition, an optical path of the laser light and an optical path of the reflected light are designed coaxially. This design can reduce an area required by a mirror in a mirror group, and further reduce a volume of the ranging system, thereby facilitating miniaturization of the ranging system.

With reference to the first aspect of embodiments of this application, in a first implementation of the first aspect of embodiments of this application, the mirror group includes more than one mirror, and the laser light reaches the measured object after being reflected by the plurality of mirrors.

With reference to the first aspect of embodiments of this application and the first implementation of the first aspect of embodiments of this application, in a second implementation of the first aspect of embodiments of this application, the ranging apparatus includes the laser, the receiver, and the holed mirror. The laser is configured to emit the laser light to the mirror group, where the laser light passes through the holed region of the holed mirror. The holed mirror includes the holed region and the unholed region, and the unholed region is configured to reflect, to the receiver, the reflected light from the mirror group. The receiver is configured to receive the reflected light of the measured object. Holing is merely a coaxial implementation, and holing can only be used as an example of coaxial design that needs to be protected, that is, an optical center of the emission optical path is the same as an optical center of the receiving optical path and a key optical component is shared.

With reference to any one of the first aspect of embodiments of this application, and the first implementation and the second implementation of the first aspect of embodiments of this application, in a third implementation of the first aspect of embodiments of this application, the coaxial optical lens group further includes the lens group. The lens group is installed between the mirror group and the holed mirror, and is configured to: convert the laser light into parallel light, or focus the reflected light.

With reference to any one of the first aspect of embodiments of this application, and the first implementation to the third implementation of the first aspect of embodiments of this application, in a fourth implementation of the first aspect of embodiments of this application, a plurality of lasers are installed on a same carrier board (such as a PCB or a ceramic PCB) configured to supply power to the lasers.

With reference to any one of the first aspect of embodiments of this application, and the first implementation to the fourth implementation of the first aspect of embodiments of this application, in a fifth implementation of the first aspect of embodiments of this application, there are more than two lasers, and laser light emitted by the lasers faces the holed region of the holed mirror. For example, a plurality of lasers are installed on a circuit board, and the plurality of lasers are deflected by a preset angle, so that laser light emitted by the plurality of lasers faces the holed region. For another example, a plurality of lasers are installed on a circuit board in an arc shape, so that laser light emitted by the plurality of lasers faces the holed region.

With reference to any one of the first aspect of embodiments of this application, and the first implementation to the fifth implementation of the first aspect of embodiments of this application, in a sixth implementation of the first aspect of embodiments of this application, the ranging apparatus further includes the processing circuit. The processing circuit is connected to the laser and the receiver. The processing circuit is configured to calculate the distance between the ranging system and the measured object based on the laser light and the reflected light.

With reference to any one of the first aspect of embodiments of this application, and the first implementation to the sixth implementation of the first aspect of embodiments of this application, in a seventh implementation of the first aspect of embodiments of this application, the processing circuit is specifically configured to calculate the distance between the ranging system and the measured object based on an emission time point of the laser light, a receiving time point of the reflected light, and a speed of light.

With reference to any one of the first aspect of embodiments of this application, and the first implementation to the seventh implementation of the first aspect of embodiments of this application, in an eighth implementation of the first aspect of embodiments of this application, the coaxial optical lens group includes a beam splitting mirror. The beam splitting mirror is configured to: receive the laser light emitted by the laser, and shape the laser light to the mirror group. The beam splitting mirror is further configured to shape the reflected light to the receiver.

A second aspect of embodiments of this application provides a mobile platform. The mobile platform includes the ranging system according to the first aspect and a mobile platform body. The mobile platform body includes a controller. The controller communicates with the ranging system through a wired interface or a wireless interface, and is configured to: receive a distance measured by the ranging system, and implement a related function based on the distance, for example, control the mobile platform to move or control a display on the mobile platform to display information about the distance. In a possible implementation, the mobile platform may be a movable apparatus such as a vehicle, an uncrewed aerial vehicle, or a robot.

With reference to the second aspect of embodiments of this application, in a first implementation of the second aspect of embodiments of this application, the ranging system is disposed on a head, a tail, a side, or a top of the mobile platform body.

With reference to the second aspect of embodiments of this application and the first implementation of the second aspect of embodiments of this application, in a second implementation of the second aspect of embodiments of this application, the controller is configured to control autonomous driving of the mobile platform based on the distance.

With reference to any one of the second aspect of embodiments of this application, and the first implementation and the second implementation of the second aspect of embodiments of this application, in a third implementation of the second aspect of embodiments of this application, the controller is configured to generate a navigation route based on the distance. After generating the navigation route, the controller may further display the navigation route on a display connected to the controller.

With reference to any one of the second aspect of embodiments of this application, and the first implementation to the third implementation of the second aspect of embodiments of this application, in a fourth implementation of the second aspect of embodiments of this application, the controller is connected to the display to display the distance.

With reference to any one of the second aspect of embodiments of this application, and the first implementation to the fourth implementation of the second aspect of embodiments of this application, in a fifth implementation of the second aspect of embodiments of this application, the distance is a distance between the mobile platform body and an obstacle. When the distance is less than a preset threshold, the controller is configured to control the mobile platform body to move in a direction away from the obstacle. For example, if the mobile platform is too close to another mobile platform in front of the mobile platform, the controller may control the mobile platform to reduce a moving speed.

In the technical solution provided in embodiments of this application, when the laser emits laser light to the mirror group by using the coaxial optical lens group, the moving component drives the mirror group to rotate, so that the laser light is irradiated to a measured object at different angles, to implement ranging of the measured object. According to embodiments of this application, only the mirror group is installed on the moving component, and therefore the moving component bears a light weight and rotates quickly. Therefore, if the ranging system is installed on a vehicle, the ranging system can implement fast ranging of incoming and outgoing vehicles and meet a ranging requirement of an autonomous driving technology. In addition, both an optical path of the laser light and an optical path of the reflected light pass through the coaxial optical lens group and are designed coaxially. This design can reduce an area required by a mirror in a mirror group, and further reduce a volume of the ranging system, thereby facilitating miniaturization of the ranging system.

DETAILED DESCRIPTION OF ILLUSTRATIVE EMBODIMENTS

In the specification, claims, and accompanying drawings of this application, the terms “first”, “second”, “third”, “fourth”, and so on (if existent) are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. Moreover, the terms “include”, “correspond to” and any other variant mean to cover non-exclusive inclusion. For example, a process, method, system, product, or device that includes a list of steps or units is not necessarily limited to those expressly listed steps or units, but may include other steps or units not expressly listed or inherent to such a process, method, system, product, or device.

In embodiments of this application, the word “example”, “for example”, or the like is used to represent giving an example, an illustration, or a description. Any embodiment or design scheme described as “example” or “for example” in embodiments of this application should not be explained as being more preferred or having more advantages than another embodiment or design scheme. Exactly, use of the word “example”, “for example”, or the like is intended to present a related concept in a specific manner.

With booming development of the vehicle industry, an autonomous driving technology of a vehicle becomes mature. A vehicle to which the autonomous driving technology is applied may be referred to as an autonomous driving vehicle. The autonomous driving vehicle is usually provided with a plurality of measurement systems and computing systems. The autonomous driving vehicle measures a situation of the autonomous driving vehicle and a surrounding situation by using the measurement systems, and then automatically calculates, by using the computing systems and based on the situations, a driving operation of the autonomous driving vehicle, for example, acceleration, deceleration, or turning. These measurement systems may include a laser ranging system, a radar ranging system, a global positioning system, and the like. The computing systems may include an artificial intelligence system, a visual computing system, and the like.

The laser ranging system may be configured to measure a distance between the autonomous driving vehicle and another vehicle, or may be configured to measure a distance between the autonomous driving vehicle and a road fence, or may be configured to measure a distance between the autonomous driving vehicle and a bumpy ground. A purpose of the ranging system is not specifically limited in embodiments of this application.

Figure 1A:
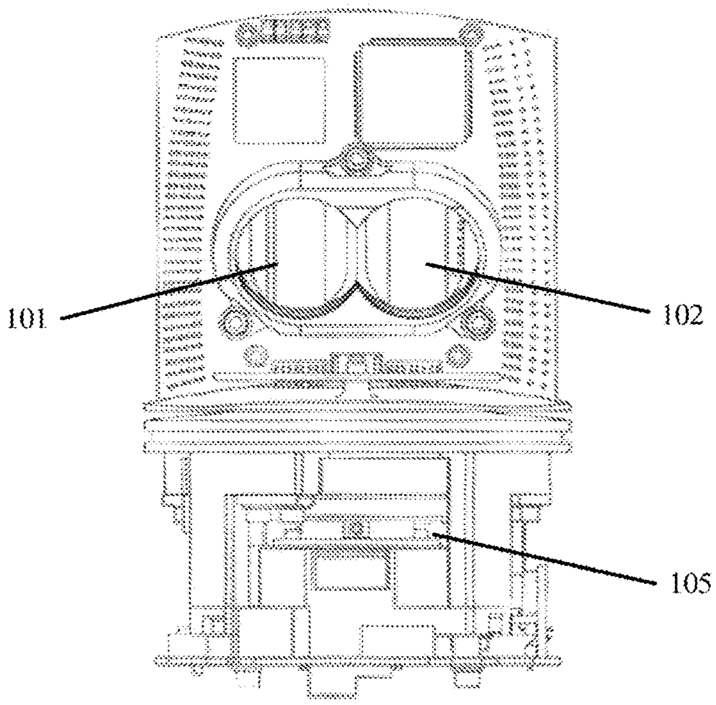
FIG. 1a PRIOR ART
FIG. 1*a* shows an example of a front view of an existing laser ranging system.
Figure 1B:
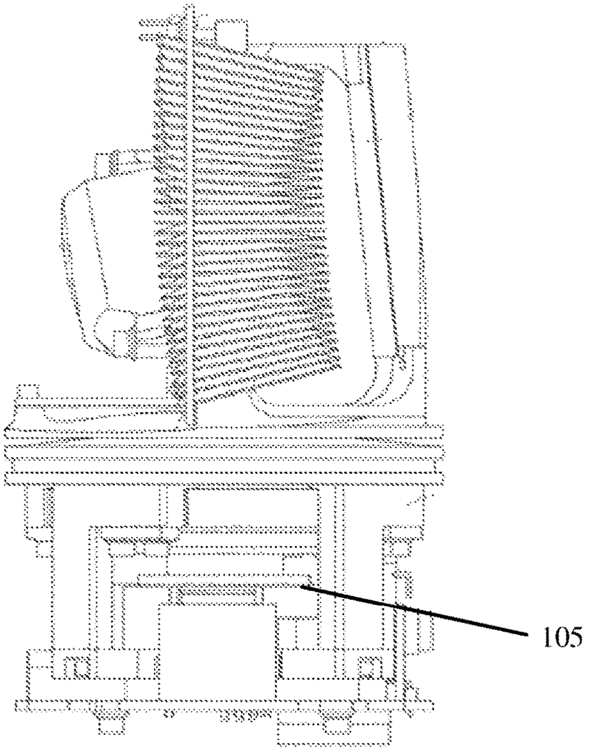
FIG. 1b PRIOR ART
FIG. 1*b* shows an example of a left view of an existing laser ranging system.
Figure 1C:
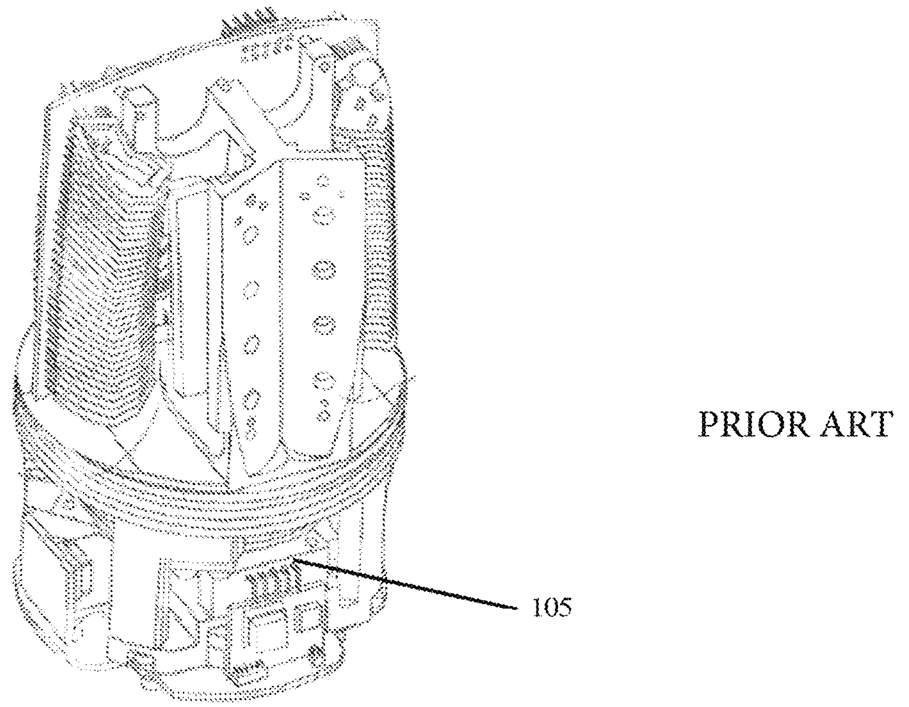
FIG. 1*c* shows an example of a three-dimensional diagram of an existing laser ranging system.
Figure 1D:
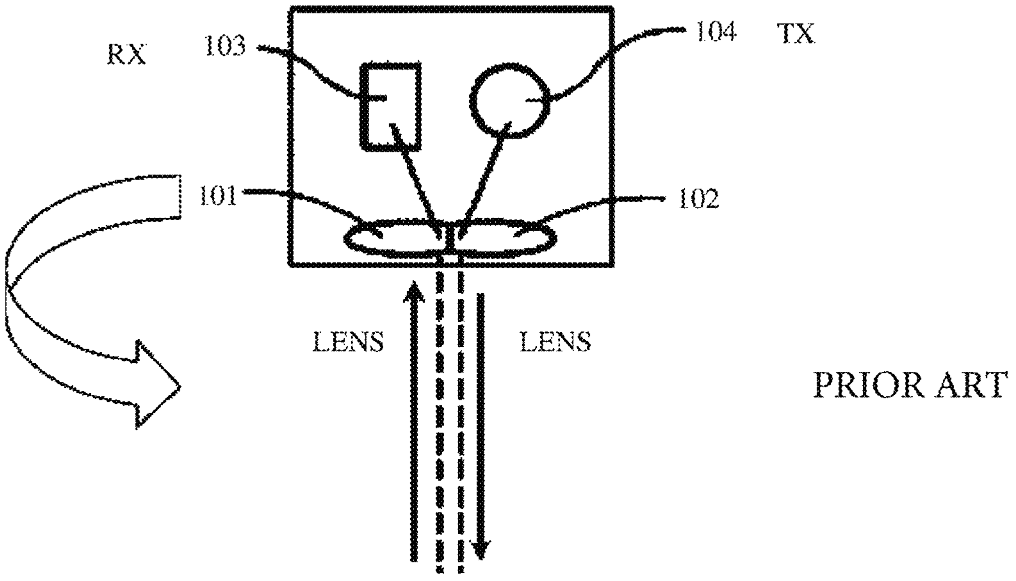
FIG. 1*d* is a schematic diagram of an existing laser ranging system.
Figure 1E:
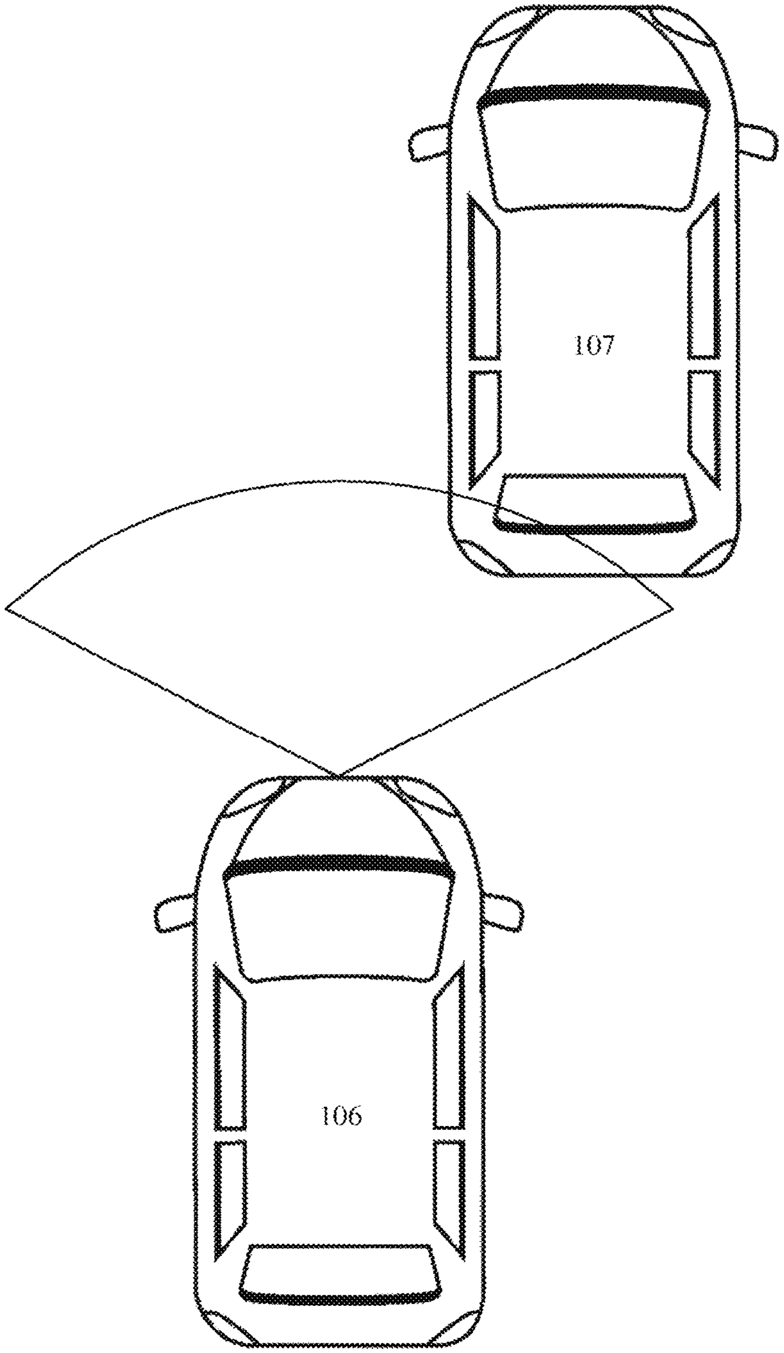
FIG. 1e PRIOR ART
FIG. 1*e* is an example diagram in which an existing laser ranging system is installed on a vehicle.

For example, as shown in FIG. 1*e*, an autonomous driving vehicle 106 measures a distance between an autonomous driving vehicle 106 and a front vehicle 107 by using a laser ranging system. Then, the autonomous driving vehicle 106 determines, by using a computing system, whether the distance is less than a safety distance. If the distance is less than the safety distance, it indicates that the autonomous driving vehicle 106 is too close to the front vehicle 107, and tail chasing is easily caused. Therefore, the autonomous driving vehicle 106 may automatically perform a deceleration operation, to prevent tail chasing.

As shown in FIG. 1*e*, it may be understood that the front vehicle 107 does not necessarily face the autonomous driving vehicle 106, and the front vehicle 107 may be in front of a side of the autonomous driving vehicle 106. Therefore, the ranging system of the autonomous driving vehicle 106 is usually designed to scan a vehicle in a front sector range, that is, to continuously perform ranging on the vehicle in the front sector area.

FIG. 1*a*, FIG. 1*b*, FIG. 1*c*, and FIG. 1*d* each show an existing laser ranging system. The laser ranging system continuously performs ranging on a vehicle in a front sector region through rotation of a turntable 105. However, in the laser ranging system, a lens 101, a lens 102, a receiver 103, a laser 104 are all disposed on the turntable 105, and the turntable 105 bears a heavy weight. Therefore, the turntable 105 rotates slowly and cannot rotate quickly.

For example, as shown in FIG. 1*e*, a direction at which the lens 102 is directed at a moment is just on a left side of the sector region, that is, the ranging system is currently performing ranging on a vehicle on the left side of the sector region. In this case, the front vehicle 107 enters a lane of the autonomous driving vehicle 106 from a right lane. Because the turntable 105 of the laser ranging system on the autonomous driving vehicle 106 cannot rotate quickly, the direction to which the lens 102 is directed cannot be quickly rotated to the right side of the sector region in time. Therefore, the laser ranging system cannot measure a distance from the front vehicle 107 in time, and the autonomous driving vehicle cannot identify a location of the front vehicle 107 in time, and cannot perform a deceleration action in time to prevent tail chasing.

In conclusion, the autonomous driving vehicle 106 having the laser ranging system cannot quickly rotate the chassis 105. Therefore, when there is a vehicle in front of the side of the autonomous driving vehicle 106, the distance between the autonomous driving vehicle 106 and the front vehicle 107 cannot be measured in time, and tail chasing is easily caused.

To resolve the foregoing technical problem of the laser ranging system, an embodiment of this application provides a ranging system, so that a measurement direction can rotate quickly by using a proper structure, to meet a requirement of an autonomous driving vehicle.

The following describes in detail technical solutions in embodiments of this application with reference to the accompanying drawings in embodiments of this application.

Figure 2:
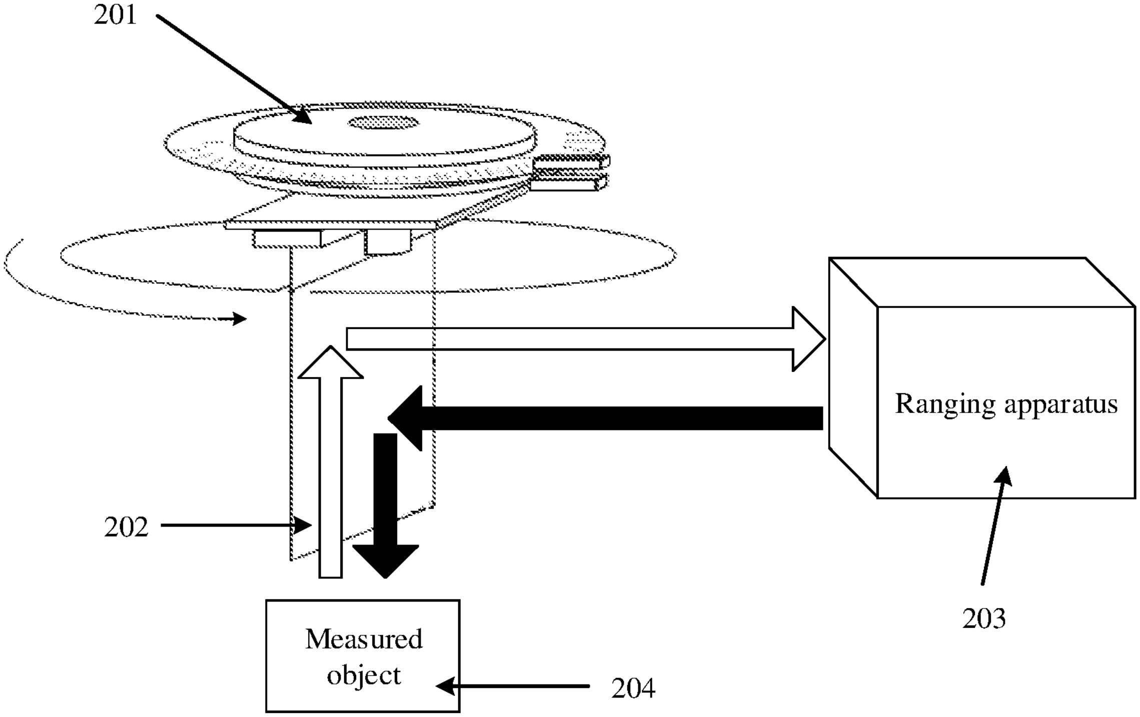
FIG. 2 is an example diagram of a ranging system according to an embodiment of this application.

FIG. 2 is an example diagram of a ranging system according to an embodiment of this application. The ranging system includes a base, a ranging apparatus 203, a mirror group 202, and a scanning component. The base is not drawn in FIG. 2. The base may be installed on a device that needs to perform ranging. In some embodiments, the base may be installed on the head of a robot. When the robot moves, the robot may measure a distance between the robot and an obstacle by using the ranging apparatus 203, the mirror group 202, and the scanning component on the base, to bypass the obstacle for walking. In some other embodiments, the base may be installed on a front, a tail, a top, or a side of a vehicle. When the vehicle performs autonomous driving, the vehicle may perform autonomous driving based on a distance between vehicles or between the vehicle and a fence that is measured by the ranging system. In actual application, the ranging system may alternatively be installed at another location by using the base. This is not specifically limited in embodiments of this application. In some embodiments, if the ranging apparatus 203, the mirror group 202, and the scanning component may be directly installed on a device, the device may be considered as a base. For example, if the ranging apparatus 203, the mirror group 202, and the scanning component are directly installed on a vehicle, the vehicle may be considered as a base.

In this embodiment of this application, the ranging apparatus 203 may be fixedly installed on one side of the base, and the scanning component may be fixedly installed on the other side of the base. Therefore, the ranging apparatus 203 and the scanning component are respectively installed on the two sides of the base. The ranging apparatus 203 is not installed on the scanning component, and the scanning component does not need to bear a heavy weight. Therefore, the scanning component rotates quickly.

Figure 3A:
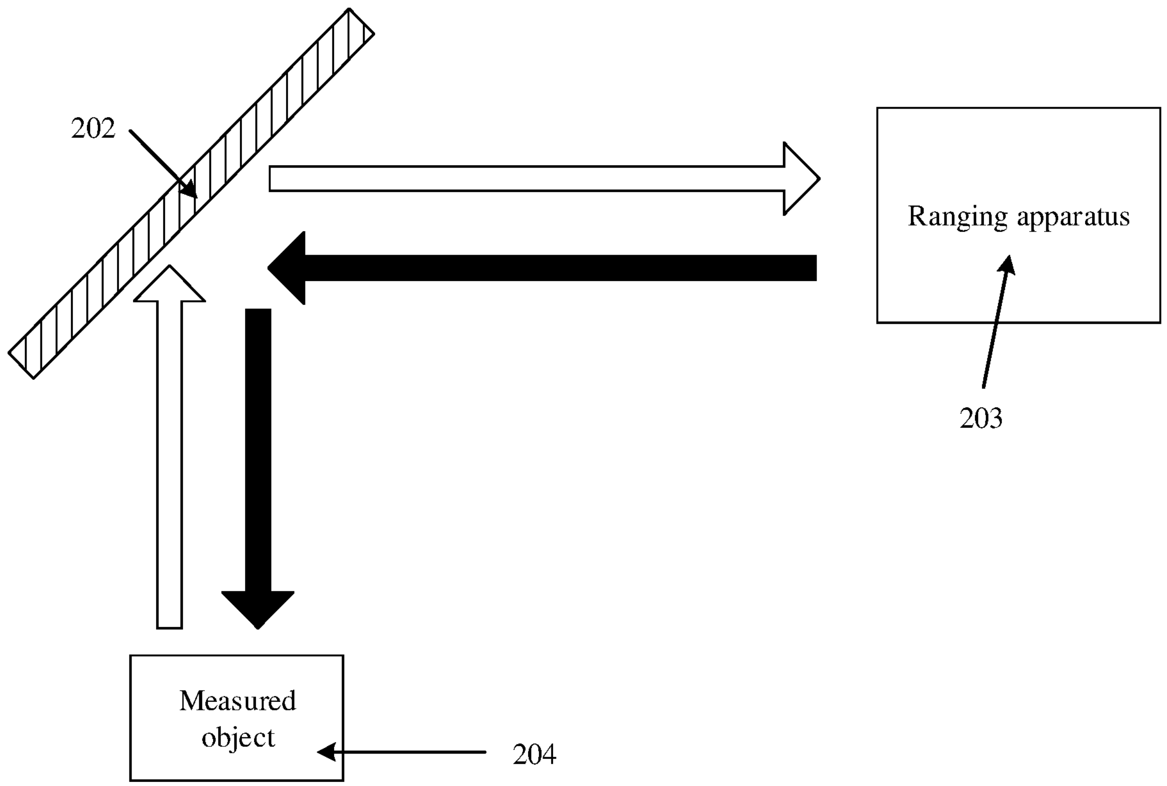
FIG. 3*a* is an example diagram 1 of an optical path of a ranging system according to an embodiment of this application.
Figure 3B:
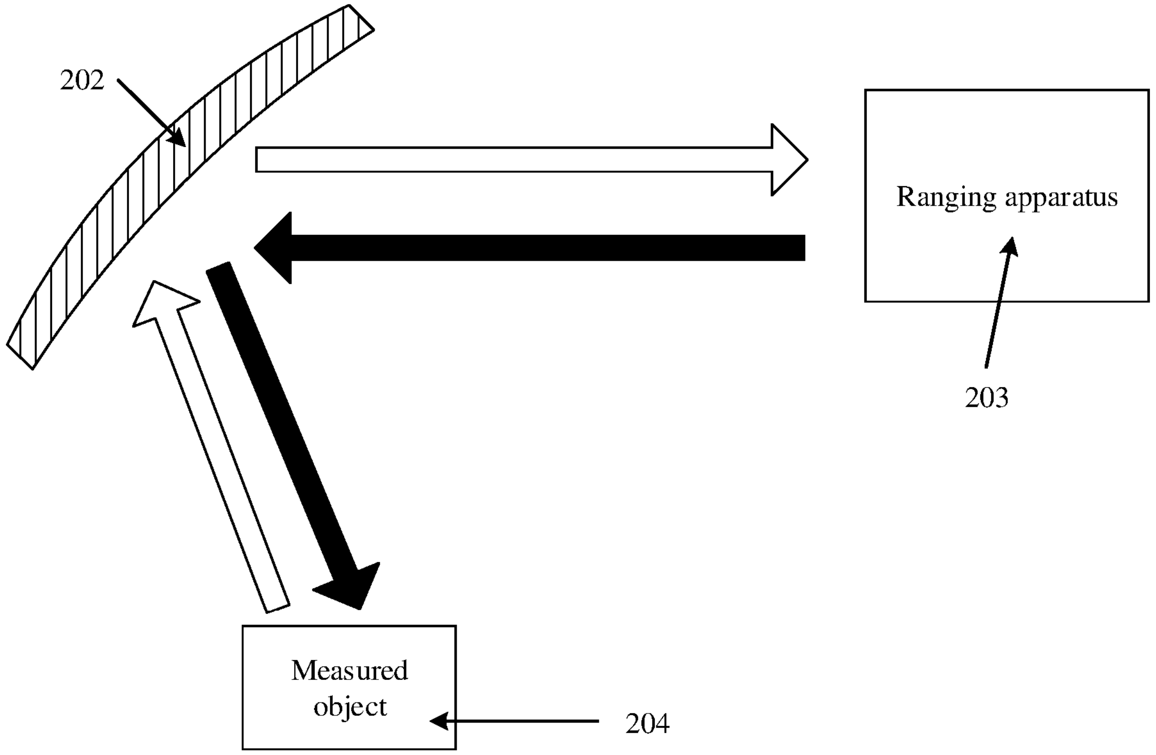
FIG. 3*b* is an example diagram 2 of an optical path of a ranging system according to an embodiment of this application.
Figure 3C:
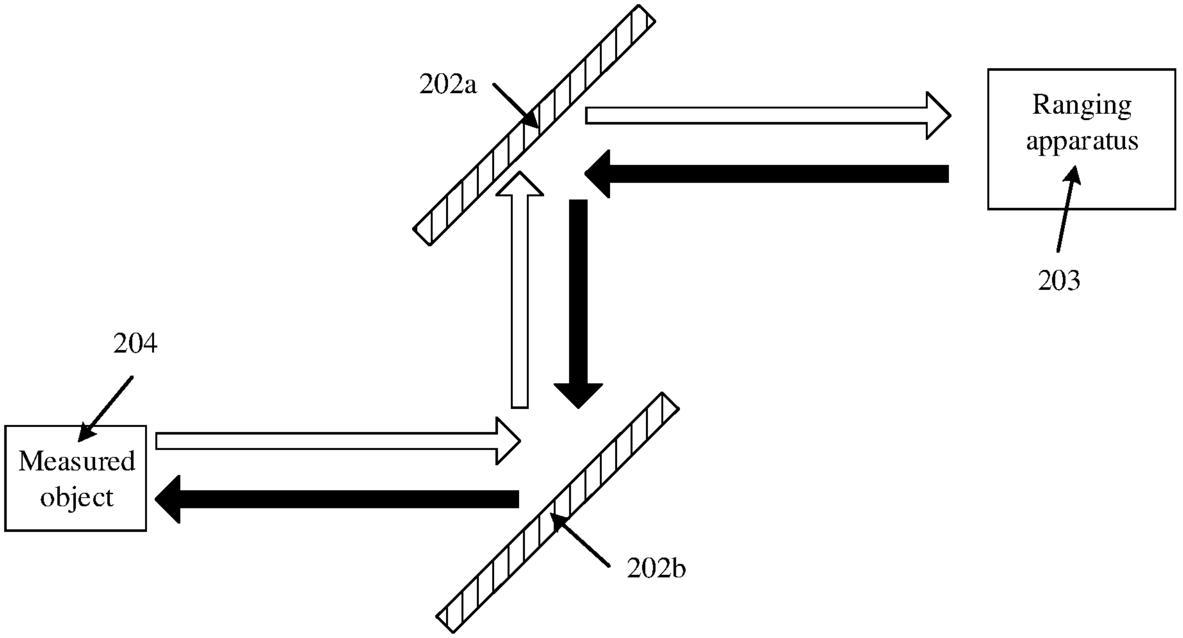
FIG. 3*c* is an example diagram 3 of an optical path of a ranging system according to an embodiment of this application.

In some embodiments, the scanning component may include a moving component and the mirror group 202. For example, the moving component includes a motor and a turntable 201 connected to the motor. In actual application, the moving component may alternatively be a motor alone. This is not limited in embodiments of this application. The mirror group 202 may be installed on the turntable 201 or directly installed on the motor. In this embodiment of this application, descriptions are provided by using an example in which the moving component includes the motor and the turntable 201 connected to the motor. For another implementation solution of the moving component, refer to this embodiment of this application. The mirror group 202 is installed on the turntable 201. A function of the mirror group 202 may be: transferring, to a measured object 204, laser light (represented by black shaded arrows in FIG. 2) emitted by the ranging apparatus 203, or transferring, to the ranging apparatus 203, reflected light (represented by white shaded arrows in FIG. 2) reflected by the measured object 204. In some embodiments, as shown in FIG. 2, the mirror group 202 may be one planar mirror. As shown in FIG. 3*a*, laser light is transferred to the measured object 204 through the planar mirror, and reflected light is transferred to the ranging apparatus 203 through the planar mirror. In some other embodiments, the mirror group 202 may be one curved mirror. As shown in FIG. 3*b*, laser light is transferred to the measured object 204 through the curved mirror, and reflected light is transferred to the ranging apparatus 203 through the curved mirror. In some other embodiments, the mirror group 202 may include two planar mirrors. As shown in FIG. 3*c*, laser light is transferred to a second planar mirror 202*b* through a first planar mirror 202*a*, and then is transferred to the measured object 204, and reflected light is transferred to the first planar mirror 202*a* through the second planar mirror 202*b*, and then is transferred to the ranging apparatus 203. In actual application, the mirror group 202 may alternatively implement the function of the mirror group 202 in another form. This is not specifically limited in this embodiment of this application. The mirror group 202 mainly includes a mirror, and therefore may also be referred to as a mirror group.

According to this embodiment of this application, the turntable 201 is configured to drive the mirror group 202 to rotate around a center axis of the mirror group 202. In some embodiments, as shown in FIG. 2, the mirror group 202 is one planar mirror. In this case, the turntable 201 is connected to the planar mirror, so that the planar mirror rotates around a center axis. As the mirror group 202 rotates, an emission angle of laser light or reflected light passing by the mirror group 202 correspondingly changes. For example, if the mirror group 202 rotates by one degree, an emission angle of the laser light or the reflected light transferred by the mirror group 202 correspondingly shifts by two degrees.

According to this embodiment of this application, the turntable 201 may be connected to the motor, and rotation of the motor drives the turntable to rotate, so that the turntable can drive the mirror group 202 to rotate. In actual application, the turntable 201 may alternatively rotate in another manner, for example, in a manner in which a track drives a gear to rotate. This is not limited in this embodiment of this application.

In some embodiments, the scanning component may be a component other than a motor with a mirror to implement optical scanning, for example, a micro-electro-mechanical system (MEMS) or a vibrating mirror, or may be a waveguide or a liquid crystal that adjusts an optical direction.

In the existing laser ranging system (shown in FIG. 1*a*, FIG. 1*b*, FIG. 1*c*, and FIG. 1*d*), the turntable 105 needs to drive the lens 101, the lens 102, the receiver 103, the laser 104, and the like to implement scanning of the ranging system. Therefore, the turntable 105 bears a heavy weight and rotates slowly. In this embodiment of this application, the turntable 201 only needs to drive the mirror group 202 to rotate to change directions of the laser light and the reflected light, to implement scanning mode the ranging system. Therefore, in this embodiment of this application, the turntable 201 does not need to drive the ranging apparatus 203, and the turntable 201 bears a light weight and rotates quickly, so that quick scanning and ranging can be implemented.

In the existing laser ranging system (shown in FIG. 1*a*, FIG. 1*b*, FIG. 1*c*, and FIG. 1*d*), both the laser 104 and the receiver 103 that rotate on the turntable 105 need to be powered to work. Supplying power to the objects that rotate on the turntable brings many disadvantages, such as increasing circuit costs, increasing power consumption, and increasing a weight. Compared with that in this solution, the ranging system provided in this embodiment of this application does not need to supply power to an object that rotates on the turntable 201 (does not need to supply power to the mirror group 202), to avoid various defects of using a slip ring or wireless power supply.

In addition, in this embodiment of this application, the ranging apparatus 203 is not installed on the turntable 201. Therefore, a power supply corresponding to the ranging apparatus 203 may be disposed at a fixed location.

Figure 9:
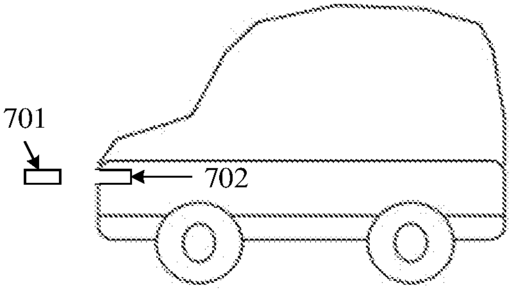
FIG. 9 is an example diagram in which a ranging system is installed on a vehicle according to an embodiment of this application.

In some embodiments, the ranging system provided in this embodiment of this application may further include a housing. The housing is installed on a base, and the ranging apparatus 203, the mirror group 202, and the turntable 201 are all disposed in the housing. In addition, the housing may be provided with a notch for emission of laser light and for entrance of reflected light. In some embodiments, a groove may be disposed on the autonomous driving vehicle, and the ranging system that includes the housing may be installed in the groove. For example, as shown in FIG. 9, a ranging system 701 may be embedded into a groove 702. It may be understood that components in the autonomous driving vehicle may pass through the groove 702, and are connected to the ranging system 701 through various interfaces or lines.

In some other embodiments, a screw hole may be disposed on the base for the ranging system, so that the ranging system is installed on the autonomous driving vehicle by using a screw fastening function. In actual application, components in the ranging system, such as the ranging apparatus 203, the mirror group 202, and the turntable 201, may be installed on the autonomous driving vehicle in a proper manner based on an actual situation. A specific method for installing the ranging system is not limited in this embodiment of this application.

Figure 4:
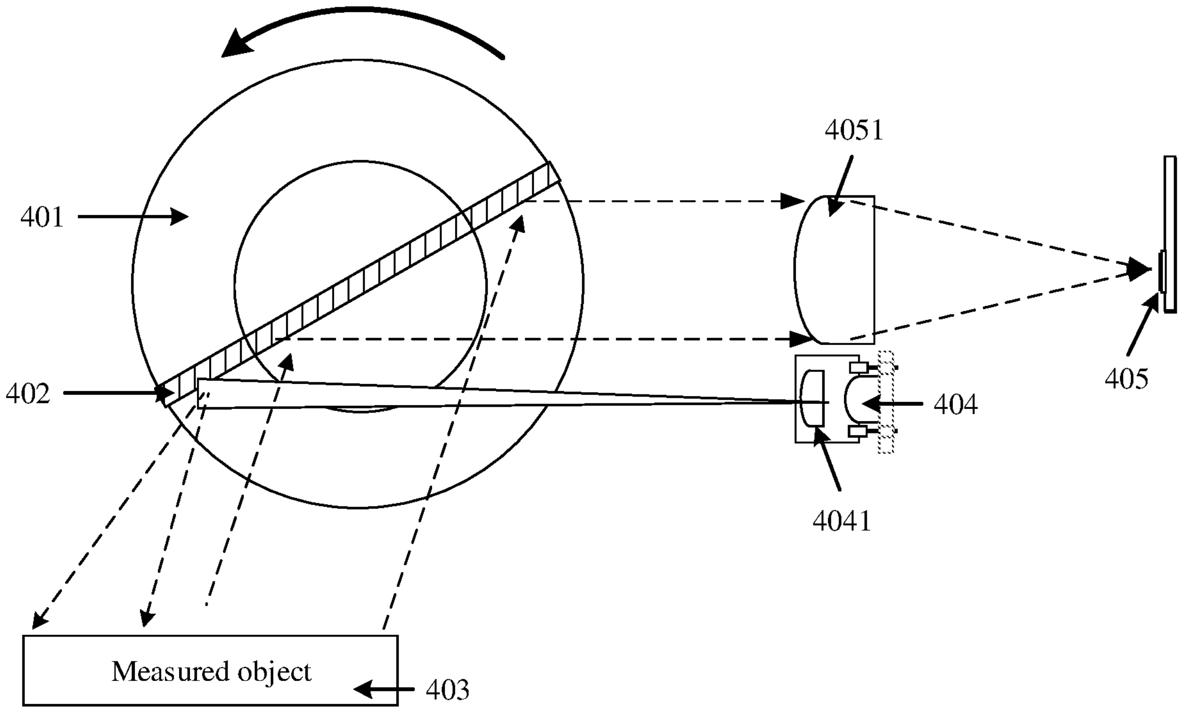
FIG. 4 is a top view of a ranging system according to an embodiment of this application.

In some embodiments, FIG. 4 is a top view of a ranging system according to an embodiment of this application. It can be learned that, in a horizontal direction, after laser light emitted by a laser 404 is optically shaped by using a lens 4041, the laser light is reflected by a mirror 402 on a turntable 401, and then reaches a measured object 403. Reflected light reflected by the measured object 403 reaches a lens 4051 after passing through the mirror 402, and the reflected light reaches a receiver 405 after being optically shaped by the lens 4051. The mirror 402 may be a planar mirror. It can be learned that in this embodiment, in the horizontal direction, the lens 4041 is configured to optically shape the laser light, and the lens 4051 is configured to optically shape the reflected light. An optical path for emitting the laser light and an optical path for receiving the reflected light are not shared. The two optical paths occupy much horizontal space. In this case, a mirror 402 with a long horizontal width is required to meet a design requirement. In addition, because the emission optical path is not at a location close to a center, after the emission optical path is rotated to a specific extent, emitted light may exceed an edge of the mirror 402, resulting in a decrease of a scanning range.

Figure 5:
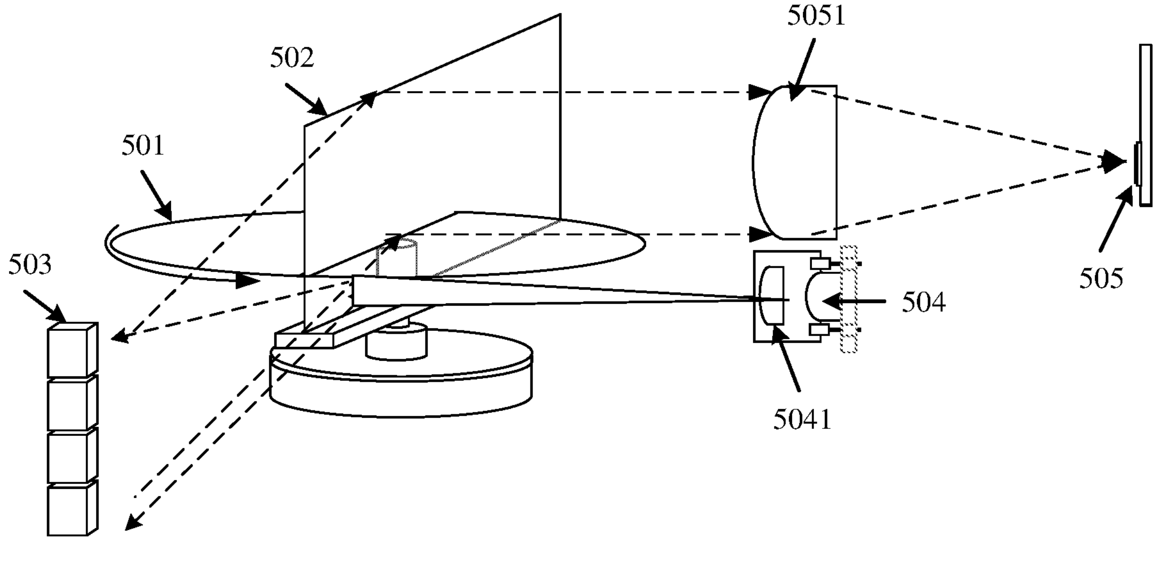
FIG. 5 is a three-dimensional diagram of a ranging system according to an embodiment of this application.

For another example, in some embodiments, FIG. 5 is a three-dimensional diagram of a ranging system according to an embodiment of this application. It can be learned that, in a vertical direction, after laser light emitted by a laser 504 is optically shaped by a lens 5041, the laser light is reflected by a mirror 502 on a turntable 501, and then reaches a measured object 503. Reflected light reflected by the measured object 503 reaches a lens 5051 after passing through the mirror 502, and the reflected light reaches a receiver 505 after being optically shaped by the lens 5051. The mirror 502 may be a planar mirror. It can be learned that in this embodiment, in the vertical direction, the lens 5041 is configured to optically shape the laser light, and the lens 5051 is configured to optically shape the reflected light. An optical path for emitting the laser light and an optical path for receiving the reflected light are not shared. The two optical paths occupy much vertical space. In this case, a mirror 502 with a long vertical height is required to meet a design requirement. In particular, for autonomous driving detection, it is expected that a large range in the vertical direction can be detected as much as possible. Therefore, a divergence angle in the vertical direction of a laser is also large. In this case, a rotation mirror height occupied by the laser is close to a height at which laser light is received.

With reference to the ranging systems shown in FIG. 4 and FIG. 5, the optical path for emitting the laser light and the optical path for receiving the reflected light are not shared. Consequently, a length of the mirror or the mirror group is required to be long in both the horizontal direction and the vertical direction, and an area of the mirror or the mirror group is required to be large. Finally, a volume of the ranging system is large. In addition, the design is more effective when a divergence angle of a laser beam increases. Therefore, this design causes a significant increase in the volume of the entire ranging system in the horizontal direction or the vertical direction.

Figure 6:
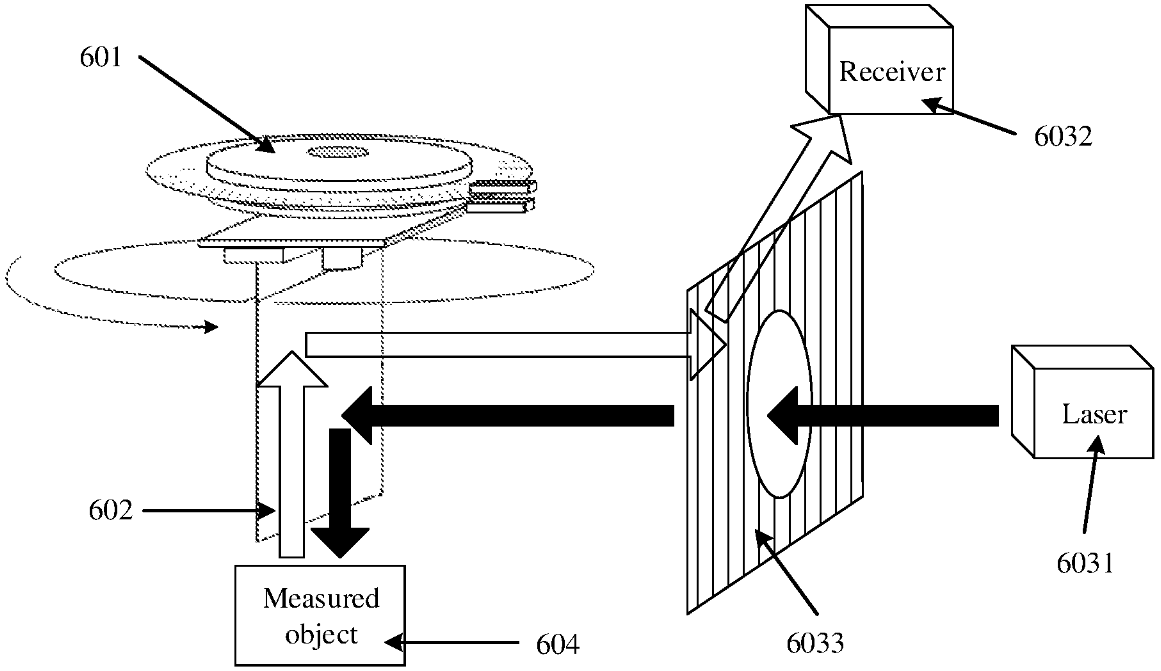
FIG. 6 is an example diagram of another embodiment of a ranging system according to an embodiment of this application.

To resolve the technical problem of the large volume of the ranging system shown in FIG. 4 or FIG. 5, as shown in FIG. 6, an embodiment of this application further provides another embodiment of a ranging system. FIG. 6 is an example diagram of another embodiment of a ranging system according to an embodiment of this application. The ranging system includes a base, a ranging apparatus, a mirror group 602, and a scanning component. The base, the mirror group 602, and a turntable 601 are similar to the base, the mirror group 202, and the scanning component in the foregoing embodiment corresponding to FIG. 2. Details are not described herein again.

In some embodiments, the ranging apparatus may include a laser 6031, a receiver 6032, and a coaxial optical lens group.

The laser 6031 may be configured to emit laser light to the mirror group 602, and the laser light is transferred by the mirror group 602 and then irradiated to a measured object 604. In some embodiments, the laser 6031 may be specifically installed on a printed circuit board (PCB). In some other embodiments, the laser 6031 may be a laser bare die chip that is not packaged. Specifically, the laser bare die chip that is not packaged may be installed on a PCB, and the laser bare die chip is connected to a processing circuit through wire bonding performed by using a gold wire. The processing circuit may be configured to calculate a distance between the ranging system and the measured object 604. When the laser 6031 is the laser bare die chip that is not packaged, the ranging apparatus can be more miniaturized. In actual application, the laser 6031 may be a continuous laser or a pulse laser. A type of the laser 6031 is not specifically limited in this embodiment of this application. The receiver 6032 may be configured to receive reflected light from the measured object 604. In some embodiments, the receiver 6032 may be installed on a PCB. In some other embodiments, the receiver 6032 may be a receiver bare die chip that is not packaged. Specifically, the receiver bare die chip that is not packaged may be installed on a PCB, and the receiver bare die chip is connected to a processing circuit through wire bonding performed by using a gold wire. When the receiver 6032 is the receiver bare die chip that is not packaged, the ranging apparatus can be more miniaturized. In some embodiments, the receiver 6032 may be an avalanche photon diode (APD) that has features of a high-speed response, a high gain, a low junction capacitance, and low noise and is very suitable for laser ranging.

It may be understood that the PCB on which the laser 6031 is installed and the PCB on which the receiver 6032 is installed may not be a same PCB, or may be a same PCB. This is not limited in this embodiment of this application. A plurality of lasers 6031 may be disposed on one PCB. A quantity of lasers 6031 is not limited in this embodiment of this application. A plurality of receivers 6032 may be disposed on one PCB. A quantity of receivers 6032 is not limited in this embodiment of this application.

In some embodiments, the ranging apparatus may further include a processing circuit. The processing circuit is connected to the laser 6031 and the receiver 6032, and is configured to calculate a distance between the ranging system and the measured object 604 based on a case in which the laser 6031 emits laser light and the receiver 6032 receives reflected light. The processing circuit may be designed to calculate the distance between the ranging system and the measured object 604 by using a laser ranging method. The laser ranging method may include a pulse method, a phase method, and the like. In some embodiments, the processing circuit may be specifically designed to calculate the distance between the ranging system and the measured object 604 by using the pulse method. A calculation formula of the pulse method may be as follows:

$$D = \frac{ct}{2}.$$

Herein, D is a distance between the ranging system and the measured object 604, c is a speed of light, and t is a time difference between a time point at which the laser 6031 emits laser light and a time point at which the receiver 6032 receives corresponding reflected light. In actual application, the speed of light may be 300,000 km/s or another value. This is not specifically limited in this embodiment of this application.

For example, in one calculation process, the processing circuit may first record a time point at which the laser 6031 emits laser light as 01:00:00, and then the processing circuit detects that a return time point at which the receiver 6032 receives reflected light corresponding to the laser light is 01:00:0.0000001, so that a time difference t is equal to 0.0000001. The processing circuit may learn, through calculation according to the calculation formula of the pulse method, that the distance D between the ranging system and the measured object 604 is 15 meters.

In some embodiments, to improve distance measuring precision, after calculating the distance D, the processing circuit may further subtract, from the distance D, a distance of the reflected light from the mirror group 602 to the receiver 6032. In actual application, the laser ranging method performed by the processing circuit may be finely adjusted based on an actual situation. This is not specifically limited in this embodiment of this application. The laser ranging method performed by the processing circuit is an implementation or an example in which the processing circuit calculates the distance between the ranging system and the measured object 604. In actual application, the processing circuit may alternatively be designed to calculate the distance between the ranging system and the measured object 604 by using another calculation method such as a phase method. A design of the processing circuit is not specifically limited in this embodiment of this application.

In some embodiments, the processing circuit may be a component such as a microprocessor, a central processing unit, a main processor, a single-chip microcomputer, a controller, or an application-specific integrated circuit (ASIC), and is connected to the laser 6031 and the receiver 6032 through interfaces and lines, to execute various types of digital storage instructions, so as to calculate the distance between the ranging system and the measured object 604 according to an algorithm.

In some embodiments, the foregoing processing circuit may be installed on the circuit board on which the receiver is installed. The processing circuit may implement the foregoing distance calculation method in a form of a simple circuit. Details are not described in this embodiment of this application.

In some embodiments, the coaxial optical lens group may be a holed mirror, or may be a mirror with a lens disposed in the middle. In actual application, the coaxial optical lens group may alternatively be another coaxial optical lens group that can implement coaxial design. This is not limited in this embodiment of this application. To clearly describe the solutions of this application, the holed mirror is used as an example below for detailed description.

Figure 7:
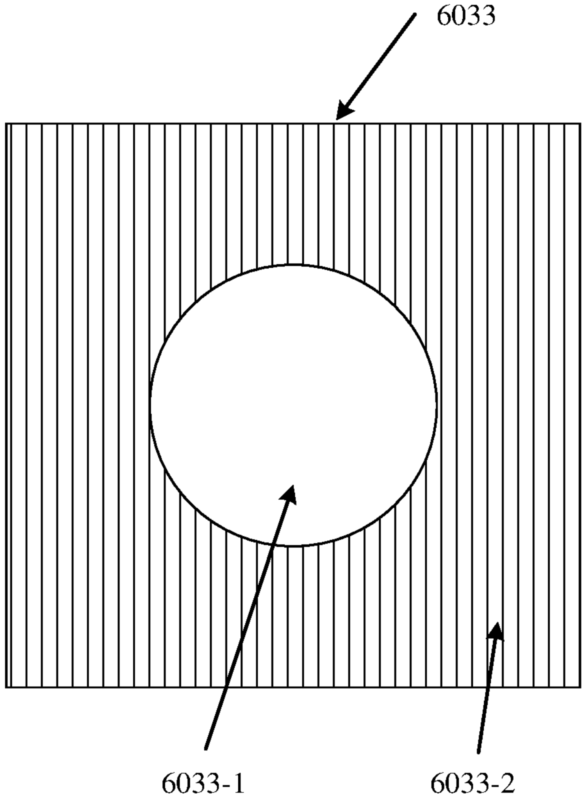
FIG. 7 shows an example of a front view of a holed mirror in another embodiment of a ranging system according to an embodiment of this application.

FIG. 7 shows an example of a front view of a holed mirror 6033. The holed mirror 6033 includes a holed region 6033-1 and an unholed region 6033-2. In some embodiments, the holed region 6033-1 may be a circle. In some other embodiments, the holed region 6033-1 may be an ellipse or a triangle. In addition, in some implementation examples, the lens is not holed, a reflective film is plated in the region 6033-2, and an antireflective film is plated in the region 6033-1. The antireflective film region transmits light, and the reflective film region reflects light. A shape of the holed region 6033-1 is not specifically limited in this embodiment of this application. In some embodiments, the unholed region 6033-2 may be a reflective mirror surface. Therefore, when reflected light is irradiated to the unholed region 6033-2, the reflected light is reflected to the receiver 6032.

Figure 8:
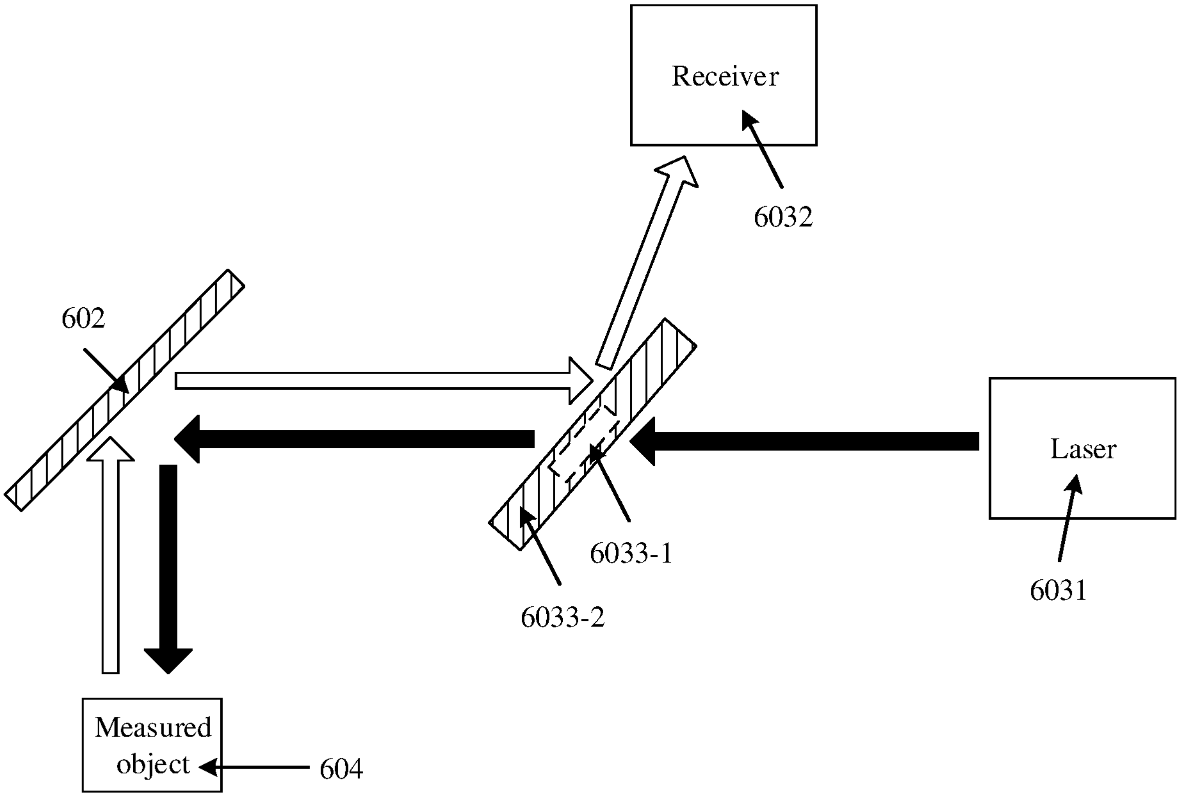
FIG. 8 is a schematic top view of a ranging system according to an embodiment of this application.

In this embodiment of this application, the holed mirror 6033 may be configured to enable laser light emitted by the laser 6031 to pass through the holed region 6033-1, and may be further configured to enable reflected light reflected by the measured object 604 to be reflected, in the unholed region 6033-2, to the receiver 6032. For example, FIG. 8 is a schematic top view of a ranging system according to an embodiment of this application. Laser light emitted by the laser 6031 passes through the holed region 6033-1, and is reflected to the measured object 604 through the mirror group 602. Reflected light reflected by the measured object 604 is reflected to the unholed region 6033-2 through the mirror group 602, and is reflected to the receiver 6032 through the unholed region 6033-2.

According to the ranging system provided in embodiments of this application, the holed mirror 6033 enables the laser 6031 and the receiver 6032 to use a coaxial optical path, so that an area of the mirror group 602 forwarding the coaxial optical path can be designed to be small. Therefore, according to the ranging system provided in embodiments of this application, an area of the mirror group 602 can be reduced, manufacturing costs of the ranging system can be reduced, and a volume of the ranging system can be reduced.

In some embodiments, the coaxial optical lens group may alternatively be a mirror with a lens disposed in the middle. The mirror with the lens disposed in the middle may be formed by inlaying a lens in a through hole in the middle of the holed mirror 6033. The lens may be a convex lens, a concave lens, or a lens in another form. This is not limited in this embodiment of this application.

In some embodiments, the coaxial optical lens group may alternatively be designed as a beam splitting mirror. When laser light is emitted to the beam splitting mirror, the laser light passes through the beam splitting mirror. When reflected light returns along an emission optical path of the laser light, the reflected light is reflected by the beam splitting mirror to the receiver. Alternatively, when laser light is emitted to the beam splitting mirror, the laser light is reflected by the beam splitting mirror to the mirror group. When reflected light returns along an emission optical path of the laser light, the reflected light passes through the beam splitting mirror and reaches the receiver. A specific design of the beam splitting mirror is not limited in this embodiment of this application.

In actual application, the coaxial optical lens group may alternatively be another mirror group that can implement a coaxial design. This is not limited in this embodiment of this application.

In some embodiments, the ranging system provided in this embodiment of this application may further include a housing. The housing is installed on the base, and the ranging apparatus, the mirror group 602, and the turntable 601 are all disposed in the housing. In addition, the housing may be provided with a notch for the laser light to exit and for the reflected light to enter. In some embodiments, a groove may be disposed on the autonomous driving vehicle, and the ranging system that includes the housing may be installed in the groove. For example, as shown in FIG. 9, a ranging system 701 may be embedded into a groove 702. It may be understood that a plurality of holes may be disposed on the groove 702, so that components in the autonomous driving vehicle may pass through the groove 702, and are connected to the ranging system 701 through various interfaces or lines.

Figure 10:
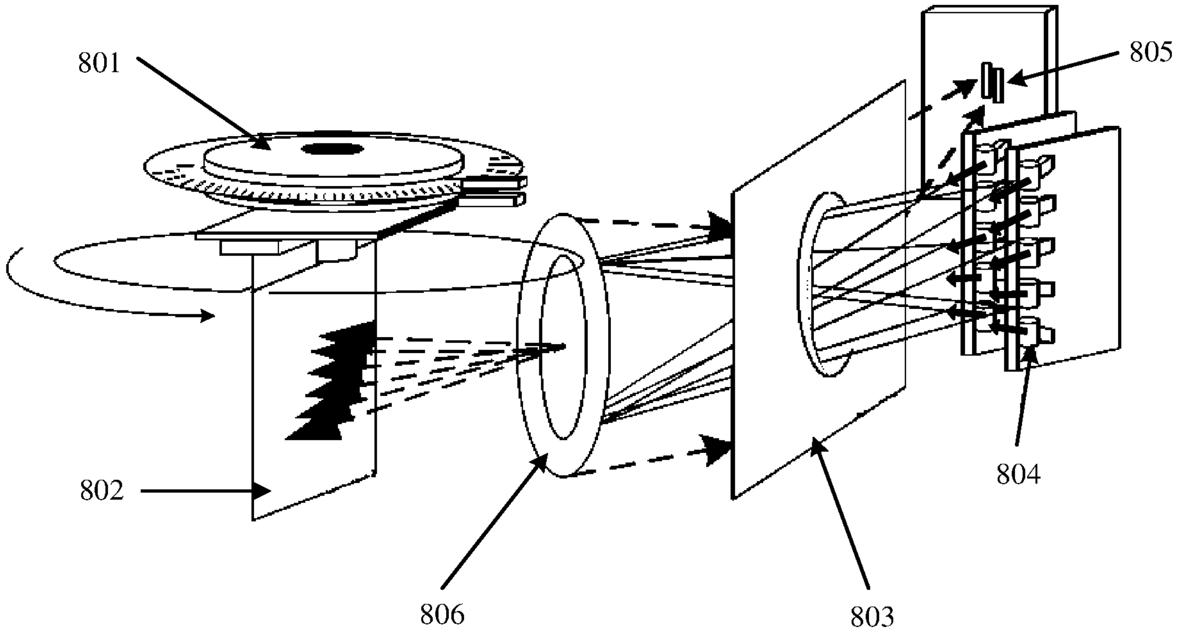
FIG. 10 is an example diagram of still another embodiment of a ranging system according to an embodiment of this application.

In some other embodiments, a screw hole may be disposed on the base for the ranging system, so that the ranging system is installed on the autonomous driving vehicle by using a screw fastening function. In actual application, components in the ranging system, such as the ranging apparatus, the mirror group 602, and the turntable 601, may be installed on the autonomous driving vehicle in a proper manner based on an actual situation. A specific method for installing the ranging system is not limited in this embodiment of this application. Further, FIG. 10 is an example diagram of still another embodiment of a ranging system according to an embodiment of this application. The ranging system includes a base, a ranging apparatus, a mirror group 802, and a turntable 801. The base, the mirror group 802, and the turntable 801 are similar to the base, the mirror group 202, and the turntable 201 in the foregoing embodiment corresponding to FIG. 2. Details are not described herein again.

In some embodiments, the ranging apparatus may include a lens group 806, a laser 804, a receiver 805, and a holed mirror 803. The laser 804, the receiver 805, and the holed mirror 803 are similar to the laser 6031, the receiver 6032, and the holed mirror 6033 in the foregoing embodiment corresponding to FIG. 8. Details are not described herein again.

In this embodiment of this application, a coaxial optical lens group further includes a lens group 806. The lens group 806 is disposed between the mirror group 802 and the holed mirror 803, and may be configured to shape laser light passing through the holed mirror 803 into parallel laser light, or may be configured to focus, to the receiver 805, reflected light transferred by the mirror group 802. In some embodiments, the lens group 806 may be specifically a convex lens or a cylindrical lens. In some other embodiments, the lens group 806 may be one lens, or may be a combination of a plurality of lenses, for example, a combination of a convex lens and a planar lens. A specific combination manner of the lens group 806 is not limited in this embodiment of this application.

In some embodiments, there may be a plurality of lasers 804. For example, there are a total of 10 lasers 804 in FIG. 10. During disposing, these lasers 804 may be deflected by preset angles to face a holed region of the holed mirror 803. Therefore, orientations of the lasers 804 may have a specific angle difference, and laser light emitted by the lasers 804 may not be parallel, but approach the holed region of the holed mirror 803. After passing through the holed region of the holed mirror 903, the laser light reaches the lens group 806. The laser light is processed by a series of lenses in the lens group 806, and may be shaped into parallel laser light. Finally, the parallel laser light reaches the measured object after being reflected by the mirror group 802.

In some other embodiments, when there may be a plurality of lasers 804, the plurality of lasers 804 may be installed on a circuit board in an arc shape, so that laser light emitted by the plurality of lasers 804 faces the holed region. In actual application, after passing through the holed region, the laser light may be shaped into parallel laser light in a manner of using a focusing lens. This is not limited in this embodiment of this application.

In some embodiments, reflected light reflected by the measured object reaches the lens group 806 after being reflected by the mirror group 802. The lens group 806 may have a light focusing function. Therefore, the reflected light may be focused when passing through the lens group 806. After being focused, the reflected light may be reflected by an unholed region of the holed mirror 803, and finally converge to a focus location. Therefore, the receiver 805 may be disposed at the focus location, to receive more reflected light and improve sensitivity of the ranging system. In some embodiments, there may be a plurality of receivers 805. For example, there are two receivers 805 in FIG. 10.

In some embodiments, several mirrors may be disposed between the lens group 806 and the laser 804 to form a "Z"-shaped optical path, so that a volume of the ranging apparatus can be further reduced. Similarly, several mirrors may also be disposed between the lens group 806 and the receiver 805. In some other embodiments, several mirrors may alternatively be disposed between the lens group 806 and the mirror group 802. An implementation in which a mirror is disposed between components in the ranging system to adjust an optical path is not limited in this embodiment of this application. In the foregoing embodiment in which the mirrors are disposed, not only an optical path can be changed based on an actual requirement to adapt to actual application, but also space in the ranging system can be properly used after the optical path is changed, to further reduce a volume of the ranging apparatus.

In some embodiments, a location of the receiver 805 may correspond to the laser 804, so that laser light emitted by each laser 804 is received by a corresponding receiver. The location of the receiver 805 may be determined by testing laser light emitted by the laser 804. For example, in an installation and debugging process or a factory debugging process of the ranging system, a debugging personnel may use the laser 804 to emit laser light, and the laser light reaches a measured object after passing through the holed mirror 803, the lens group 806, and the mirror group 802. Then, reflected light reflected by the measured object reaches a circuit board on which the receiver 805 is located. The debugging personnel may use a photosensitive detection device to detect a location of the reflected light on the circuit board. Finally, the debugging personnel may change conditions such as a type of the measured object and an angle of the mirror group 802, and repeat the foregoing process of detecting a location of the reflected light, to comprehensively consider the detected location of the reflected light, so as to determine the location of the receiver 805 based on the detected location of the reflected light. At least one ranging system in the foregoing embodiments may be disposed on the autonomous driving vehicle. For example, an embodiment of this application provides an autonomous driving vehicle. As shown in FIG. 9, the autonomous driving vehicle includes five ranging systems and a vehicle body. The five ranging systems are respectively a ranging system 901, a ranging system 902, a ranging system 903, a ranging system 904, and a ranging system 905. In some embodiments, structures of the ranging system 901, the ranging system 902, the ranging system 903, the ranging system 904, and the ranging system 905 are all similar to the structure of the ranging system in the embodiment corresponding to FIG. 2, FIG. 4, or FIG. 10. An internal structure of the ranging system is not described again in this embodiment of this application.

In some embodiments, the autonomous driving vehicle may be an engine-driven vehicle, or may be a new energy vehicle driven by an electric motor. In actual application, the autonomous driving vehicle may be a hybrid electric vehicle driven by both an engine and an electric motor. The autonomous driving vehicle is not specifically limited in this embodiment of this application.

In this embodiment of this application, a manner of installing the ranging system on the vehicle body may be similar to that in the embodiment corresponding to FIG. 9. In actual application, the ranging system may alternatively be installed on the vehicle body through screw fastening or in another manner. An installation manner of the ranging system is not limited in this embodiment of this application.

Figure 11:
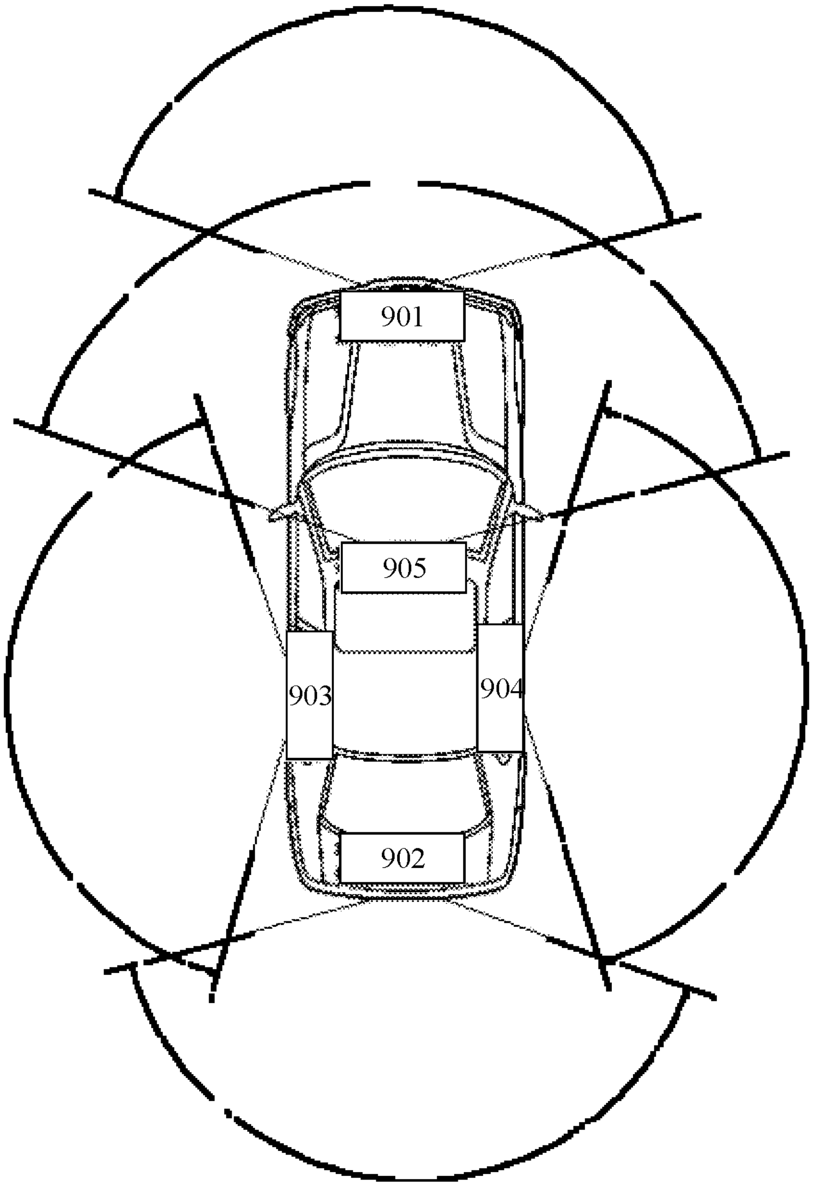
FIG. 11 is an example diagram of an embodiment of a vehicle according to an embodiment of this application.

Refer to FIG. 11. The ranging system 901 is installed at a head of the vehicle body, the ranging system 902 is installed at a tail of the vehicle body, the ranging system 903 is installed on a left side of the vehicle body, the ranging system 904 is installed on a right side of the vehicle body, and the ranging system 905 is installed on a top of the vehicle body. Therefore, the five ranging systems installed on the vehicle body can cover surroundings of the autonomous driving vehicle, and can detect, in time, an object close to the autonomous driving vehicle, for example, another vehicle or an obstacle.

In some embodiments, an autonomous driving system is further disposed on the autonomous driving vehicle. The autonomous driving system may be connected to the ranging system 901, the ranging system 902, the ranging system 903, the ranging system 904, and the ranging system 905. The autonomous driving system may receive distances measured by the five ranging systems, and then determine a traveling solution of the autonomous driving vehicle based on the distances, to implement autonomous driving. For example, if there is a pedestrian in front of the autonomous driving vehicle, when the autonomous driving vehicle does not collide with the pedestrian, the ranging system 901 can measure a distance between the autonomous driving vehicle and the pedestrian, and transmit the distance to the autonomous driving system. After receiving the distance, the autonomous driving system determines, based on the distance, that the traveling solution of the autonomous driving vehicle is emergency braking, so that under control of the autonomous driving system, the vehicle can brake in time to avoid collision with the pedestrian. In this embodiment of this application, another vehicle, a pedestrian, a fence, or the like on a road may be considered as an obstacle. To prevent the vehicle from colliding with the obstacle, when a distance between the vehicle and the obstacle that is measured by the ranging system is less than a preset threshold, the autonomous driving system may control the vehicle to avoid the obstacle and move in a direction away from the obstacle. For example, when the vehicle is too close to a middle fence, the autonomous driving system may control the vehicle to move in a direction away from the fence.

In some embodiments, the autonomous driving system may be specifically connected to the ranging system 901, the ranging system 902, the ranging system 903, the ranging system 904, and the ranging system 905 through a wire, a signal transmission line, Bluetooth, Wi-Fi, or the like. A manner of connecting the autonomous driving system to the ranging system is not limited in this embodiment of this application.

In actual application, the autonomous driving system implements a function of the autonomous driving system by using a controller. The controller may be a component such as a microprocessor, a central processing unit, a main processor, or an application-specific integrated circuit. The controller may be connected to the ranging systems (the ranging system 901, the ranging system 902, the ranging system 903, the ranging system 904, and the ranging system 905) through a wired interface or a wireless interface, and implement various functions, such as the foregoing autonomous driving function, based on the distances measured by the ranging systems.

In some embodiments, the controller may further generate a navigation route based on distances measured by the ranging systems. For example, when a vehicle driver prepares to park the vehicle into a parking lot, there may be many other vehicles or other obstacles in the parking lot. In this case, each ranging system may measure a distance between the vehicle and a nearby obstacle, and transmit the distance to the controller. The controller may generate a navigation route based on these distances and some other information. In actual application, the controller may display the generated navigation route on a display connected to the controller, so that the driver sees the navigation route and stops according to the navigation route. In actual application, the controller may further display the distance measured by each ranging system on the display. This is not limited in this embodiment of this application.

An embodiment of this application further provides a vehicle. The vehicle includes a ranging system, a driver assistant system, and a vehicle body. Both the ranging system and the driver assistant system may be installed on the vehicle body. An internal structure of the ranging system may be similar to an internal structure of the ranging system in the embodiment corresponding to FIG. 2, FIG. 4, or FIG. 10. A quantity of ranging systems is not specifically limited in this embodiment of this application.

In this embodiment of this application, the driver assistant system may include but is not limited to an adaptive cruise control system, a lane keeping assistance system, an automatic parking assistance system, a braking assistance system, a reversing assistance system, and a driving assistance system. The driver assistant system may be connected to the ranging system. A manner of connecting the driver assistant system to the ranging system is not limited in this embodiment of this application. The driver assistant system may receive a distance measured by the ranging system, and then determine a traveling solution of an assisted vehicle based on the distance, to implement driver assistance. The adaptive cruise control system is used as an example. After measuring a distance from a front vehicle, the ranging system sends the distance to the driver assistant system. After receiving the distance, the driver assistant system compares the distance with a vehicle distance set by the adaptive cruise control system. If the distance is less than the specified vehicle distance, the driver assistant system controls the vehicle to brake, or if the distance is greater than the specified vehicle distance, the driver assistant system controls the vehicle to accelerate, so that the vehicle can implement adaptive cruise control.

In actual application, the ranging system provided in this embodiment of this application may alternatively be installed on a robot, to implement automatic walking of the robot. The robot may include but is not limited to an inspection robot, a material delivery robot, and a floor sweeping robot.

In actual application, the ranging system provided in this embodiment of this application may alternatively be installed on an electric bike. When the ranging system detects that there is a pedestrian in front of the electric bike, the ranging system may control, by using a controller, an audio device connected to the controller to produce an alarm sound.

In actual application, the ranging system provided in this embodiment of this application may alternatively be installed on another mobile platform, for example, a tank, an airplane, or an uncrewed aerial vehicle. For an installation manner, a function implementation, and the like, refer to the foregoing embodiment about the vehicle. Details are not described herein again.

What is claimed is:

1. A ranging system, comprising:

a plurality of lasers arranged in an arc shape;

a receiver;

a motor comprising a rotation shaft and a turntable installed on the rotation shaft of the motor;

a mirror group including at least one first mirror installed on the turntable;

a coaxial optical lens group disposed between the mirror group and both the laser and the receiver;

a holed mirror disposed between the coaxial optical lens group and both the laser and the receiver;

a plurality of second mirrors disposed between the coaxial optical lens group and the laser, wherein the plurality of second mirrors form a "Z"-shaped optical path; and a processing circuit separately coupled to the laser and the receiver, wherein the plurality of lasers are configured to emit laser light to the coaxial optical lens group, wherein the coaxial optical lens group is configured to shape the laser light into parallel laser light and transmit the parallel laser light to the mirror group, wherein the mirror group is configured to reflect the parallel laser light to a measured object, wherein the motor is configured to drive the turntable to move the at least one first mirror to adjust an emission angle of the parallel laser light from the at least one first mirror, wherein the coaxial optical lens group is further configured to focus the reflected light to the receiver, wherein the receiver is configured to receive the reflected light, wherein the processing circuit is configured to calculate a distance between the ranging system and the measured object based on the laser light and the reflected light, and wherein an optical path of the laser light between the holed mirror and the mirror group and an optical path of the reflected light between the mirror group and the holed mirror are coaxial.

2. The ranging system according to claim 1, wherein the holed mirror comprises a holed region and an unholed region;

wherein the receiver is configured to receive the reflected light from the unholed region; and wherein the plurality of lasers are configured to emit the laser light to the holed region.

3. The ranging system according to claim 1, wherein the coaxial optical lens group is configured to perform beam shaping on the reflected light.

4. The ranging system according to claim 1, wherein the plurality of lasers are installed on a circuit board.

5. The ranging system according to claim 1, wherein the plurality of lasers or the receiver is installed on a circuit board in a form of a packaged component or a bare die chip.

6. The ranging system according to claim 1, wherein the processing circuit is configured to calculate the distance between the ranging system and the measured object based on an emission time point of the laser light, a receiving time point of the reflected light, and a speed of light.

7. The ranging system according to claim 1, wherein an area of the mirror group configured to reflect the laser light to the object to be measured coincides with an area of the mirror group configured to reflect the reflected light returned by the measured object.

8. The ranging system according to claim 1, wherein an optical center of the optical path of the laser light between the holed mirror and the mirror group is the same as an optical center of the optical path of the reflected light between the mirror group and the holed mirror.

9. A mobile platform comprises:

a ranging system; and a vehicle body comprising a controller configured to communicate with the ranging system to receive a distance measured by the ranging system, and to control the vehicle body based on the distance, wherein the ranging system comprises:

a plurality of lasers arranged in an arc shape, a receiver, a motor comprising a rotation shaft and a turntable, the turntable being installed on the rotation shaft of the motor, a mirror group including at least one first mirror being installed on the turntable, a coaxial optical lens group disposed between the mirror group and both the laser and the receiver, a holed mirror disposed between the coaxial optical lens group and both the laser and the receiver, a plurality of second mirrors disposed between the coaxial optical lens group and the laser, wherein the plurality of second mirrors form a "Z"-shaped optical path, and a processing circuit separately coupled to the laser and to the receiver, wherein the plurality of lasers are configured to emit laser light to the coaxial optical lens group, wherein the coaxial optical lens group is configured to shape the laser light into parallel laser light and transmit the parallel laser light to the mirror group, wherein the mirror group is configured to reflect the parallel laser light to a measured object, wherein the motor is configured to drive the turntable to move the at least one first mirror to adjust an emission angle of the parallel laser light from the at least one first mirror, wherein the coaxial optical lens group is further configured to focus the reflected light to the receiver, wherein the receiver is configured to receive the reflected light, wherein the processing circuit is configured to calculate a distance between the ranging system and the measured object based on the laser light and the reflected light, and wherein an optical path of the laser light between the holed mirror and the mirror group and an optical path of the reflected light between the mirror group and the holed mirror are coaxial.

10. The mobile platform according to claim 9, wherein the ranging system is disposed on a head, a tail, a side, or a top of the vehicle body.

11. The mobile platform according to claim 9, wherein the controller is configured to control the vehicle body to move based on the distance.

12. The mobile platform according to claim 9, wherein the controller is further configured to generate a navigation route based on the distance.

13. The mobile platform according to claim 12, wherein the controller is connected to a display configured to display the distance and/or the navigation route.

14. The mobile platform according to claim 9, wherein the distance is a distance between the vehicle body and an obstacle; and wherein the controller is configured to control the vehicle body to move in a direction away from the obstacle based on the distance being less than a preset threshold.

15. The mobile platform according to claim 14, wherein the plurality of lasers or the receiver is installed on a circuit board in a form of a packaged component or a bare die chip.

16. The mobile platform according to claim 14, wherein the processing circuit is configured to calculate the distance between the ranging system and the measured object based on an emission time point of the laser light, a receiving time point of the reflected light, and a speed of light.

* * * * *